(12) United States Patent
Larky (10) Patent No.: US 7,194,638 B1
(45) Date of Patent: Mar. 20, 2007

(54) DEVICE AND METHOD FOR MANAGING POWER CONSUMED BY A USB DEVICE

(75) Inventor: Steven P. Larky, Del Mar, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 529 days.

(21) Appl. No.: 10/260,108

(22) Filed: Sep. 27, 2002

(51) Int. Cl.
*G06F 1/32* (2006.01)

(52) U.S. Cl. ........................ 713/300; 713/400
(58) Field of Classification Search ........... 713/300, 713/400
See application file for complete search history.

(56) References Cited

U.S. PATENT DOCUMENTS

| | | | |
|---|---|---|---|
| 4,086,429 A * | 4/1978 | Kotezawa et al. ........... 455/79 |
| 4,553,247 A * | 11/1985 | Harris ........................ 375/214 |
| 5,581,767 A * | 12/1996 | Katsuki et al. .............. 712/11 |
| 5,905,389 A | 5/1999 | Alleven |
| 5,912,569 A | 6/1999 | Alleven |
| 5,929,664 A | 7/1999 | Alleven |
| 6,040,792 A | 3/2000 | Watson et al. |
| 6,073,193 A | 6/2000 | Yap |
| 6,085,325 A * | 7/2000 | Jackson et al. ............ 713/300 |
| 6,124,750 A | 9/2000 | Alleven et al. |
| 6,389,494 B1 | 5/2002 | Walton et al. |
| 6,490,641 B2 * | 12/2002 | Whetsel ..................... 710/104 |
| 6,541,879 B1 | 4/2003 | Wright |
| 6,625,761 B1 | 9/2003 | Sartore et al. |
| 6,665,310 B1 * | 12/2003 | Nakatsugawa ............. 370/442 |
| 6,671,831 B1 | 12/2003 | Sartore et al. |
| 6,691,201 B1 | 2/2004 | Williams et al. |
| 6,754,725 B1 | 6/2004 | Wright et al. |
| 6,791,950 B2 * | 9/2004 | Wu ........................... 370/257 |
| 6,813,672 B1 | 11/2004 | Kamran et al. |
| 6,820,160 B1 | 11/2004 | Allman |
| 6,839,778 B1 | 1/2005 | Sartore et al. |
| 2003/0107475 A1 * | 6/2003 | Bautista et al. ............ 340/7.35 |

* cited by examiner

*Primary Examiner*—Lynne H. Browne
*Assistant Examiner*—Tse Chen
(74) *Attorney, Agent, or Firm*—Brownstein Hyatt Farber Schreck, P.C.

(57) ABSTRACT

A method and device for reducing an amount of power consumed by a USB device (such as a host/hub/peripheral device which may include a receiver, phy, synchronizer, or other component associated with a data path) adapted to communicate using one or more USB signals each having a synchronization field. In this example, the method may include measuring a length of the synchronization field; associating a power down level for an idle mode based in part on the measuring operation; and disabling one or more portions of the receiver when the USB bus is inactive and/or when the USB device is transmitting data. In this manner, the one or more portions of the receiver are disabled (i.e., powered off or placed in a low power standby mode) during a times when the bus is idle or when transmitting, which can reduce the total amount of power consumed by the USB device.

8 Claims, 7 Drawing Sheets

| TIER | SYNC BITS RECEIVED FROM UPSTREAM DEVICE | SYNC BITS TRANSMITTED TO DOWNSTREAM DEVICE | EXAMPLE OF DELAY (BIT TIMES) |
|---|---|---|---|
| 1 | - | 32 | - |
| 2 | 32 | 28 | 20 |
| 3 | 28 | 24 | 16 |
| 4 | 24 | 20 | 12 |
| 5 | 20 | 16 | 8 |
| 6 | 16 | 12 | 4 |
| 7 | 12 | - | 0 |

DEVICE AND METHOD FOR MANAGING POWER CONSUMED BY A USB DEVICE

TECHNICAL FIELD

This application relates, in general, to power management of USB devices including hosts, hubs, and peripherals.

BACKGROUND

The universal serial bus (USB) provides a low cost solution for attaching peripheral devices to a host, such as a host computer or host server, so that the peripheral devices and the host can communicate with each other. Devices that are attached to a USB bus are automatically detected and software automatically configures the devices for immediate use, typically without user intervention. The USB devices/ peripherals may include devices such as printers, scanners, keyboards, a mouse, digital cameras, digital video cameras, data acquisition devices, modems, speakers, telephones or video phones, storage devices such as ZIP drives, or other peripherals or devices. A USB bus can be extended with a hub which permits additional peripherals, or other hubs, to be coupled to a USB bus.

The USB specification entitled "Universal Serial Bus Revision 2.0 Specification" available at www.usb.org, the disclosure of which is hereby incorporated by reference in its entirety, dictates various requirements and protocols for devices connected with a USB bus—such as issues relating to power management.

Typically, a USB bus may include a host connected by a USB cable to one or more peripherals/devices or hubs. By convention, data transmitted in the direction of the peripheral device is said to be in the "downstream" direction, while data transmitted in the direction of the host is said to be in the "upstream" direction.

USB supports three speeds of operation, high-speed USB supporting 480 Mega bits per second (Mbps) data rates, full speed USB supporting data rates of 12 Mbps, and low speed USB supporting data rates of 1.5 Mbps. In general, high-speed USB devices consume greater amounts of power than full speed or low speed USB devices. Such greater power consumption may affect the battery life of systems such laptop computers, personal data assistants (PDAs), portable devices, or other devices which include high-speed USB capabilities.

Accordingly, as recognized by the present inventor, what is needed is a method and apparatus for managing the power consumed by a USB device (e.g., a host, hub, or peripheral) so as to reduce the amount of power consumed by the USB device.

It is against this background that various embodiments of the present invention were developed.

SUMMARY

According to one broad aspect of one embodiment of the present invention, disclosed herein is a method for reducing an amount of power consumed by a USB device. In one example, the USB device includes a receiver associated with a data path and the USB device is adapted to communicate using one or more USB signals each having a synchronization field. In this example, the method may include measuring a length of the synchronization field; associating a power down level for an idle state based in part on the measuring operation; and disabling one or more portions of the receiver by placing the receiver in the idle state at the power down level while the USB bus is inactive and/or while the USB device is transmitting data. In this manner, the one or more portions of the receiver are placed in the idle state (i.e., powered off; placed in a very low power mode; placed in a standby mode, or other idle mode) during various times while the USB bus is inactive and/or while the device is transmitting data, which can reduce the total amount of power consumed by the USB device.

In one embodiment, the receiver includes a phy (physical interface), and the disabling operation may include disabling one or more portions of the phy for an amount of time related to power down level. In another example, the receiver includes a synchronizer for synchronizing the USB signal to a clock signal, and the disabling operation may include disabling one or more portions of the synchronizer.

In one example, the power down level may take into account the amount of time which the USB device has to synchronize to a received data signal (i.e., the more time to synchronize, the lower the power level of the idle mode). The length of the synchronization field may be measured as a total bit time, and a delay time may be calculated as a difference between the total bit time minus 12 bit times, although other calculations of delay time may be made depending upon the particular application. The delay time may be used in formulating the power down level for the idle state.

According to another broad aspect of one embodiment of the present invention, disclosed herein is a device for coupling with a USB signal bus. In one example, the device includes a transceiver having a receive data path and a transmit data path, the receive data path coupled with the signal bus for receiving a data signal from the signal bus, and the transmit data path coupled with the signal bus. The device may also include a component associated with the receive data path for processing the data signal received from the signal bus, and power control logic for controlling a power mode (i.e., on, off/low-power) of the component. In one example, the component may be in an idle state (i.e., low power or power-off mode) while the bus is inactive (i.e., no traffic) and/or when the device is transmitting data.

In another embodiment, the device may also include a detector, such as an envelope detector, for detecting the data signal on the receive data path, the detector generating a data present signal indicating a presence of the data signal, wherein the data present signal is coupled with the power control logic. Responsive to the data present signal, the power control logic sets or maintains the component in an idle mode, a low-power mode, a power-off mode or the like.

In one example, the data signal contains a synchronization field having a plurality of bits, and the power control logic measures a length of the synchronization field. The power control logic may form a delay time based in part on the length of the synchronization field, and when the transceiver is receiving the data signal, the power control logic sets or maintains the component in a power-off/low-power mode for an amount of time being approximately the delay time.

In another example, the device may also include a clock reference signal, wherein the component associated with the receive data path further comprises a synchronizer for synchronizing the data signal to the clock reference signal.

In another embodiment, the device may be characterized by a power consumption characteristic, and the component associated with the receive data path may include a first component (i.e., a first synchronizer or a first phy) being characterized by a first power consumption level and a second component (i.e., a second synchronizer or a second phy) being characterized by a second power consumption level. In this embodiment, the power control logic selectively provides a power-on signal to either the first or the second component to alter the power consumption characteristic of the device from a first amount associated with the first power consumption level to a second amount associated with the second power consumption level. Such a selective application of power signals could be based on the number of synchronization bits received by the device in a particular USB bus configuration. In this manner, the power control logic could, for example, select the use of the first component if the device is used in configurations where there is little time available for disabling the first component; and the power control logic could select the use of the second component (consuming less power than the first component) if the device is used in configurations where there is ample time available for disabling the second device. Such an embodiment may be useful if, for instance, the device is a portable USB device which a user may use in various different USB bus configurations.

According to another broad aspect of one embodiment of the present invention, disclosed herein is a method for controlling a receiver associated with a data path. In one embodiment, the method includes enabling the receiver, receiving a signal, the signal containing a synchronization field, measuring a length of the synchronization field, associating an idle state with a power down level based in part on the length, idle state for use with controlling the receiver's power cycles. The method may also include disabling the receiver, providing for detecting a second signal, providing for waiting for an amount of time related to the delay time, and providing for enabling the receiver for processing the second signal after the waiting operation.

In one example, the signal is a USB signal and wherein the synchronization field contains approximately 12 to 32 bits, and the receiver includes one or more portions of a USB transceiver, such as a phy or a synchronizer.

The foregoing and other features, utilities and advantages of the invention will be apparent from the following more particular description of various embodiments of the invention as illustrated in the accompanying drawings and claims.

DETAILED DESCRIPTION

Disclosed herein is a method and device for reducing an amount of power consumed by a USB device (which may include host/hub/peripheral device having a receiver, phy, synchronizer, or other component associated with a data path) adapted to communicate using one or more USB signals each having a synchronization field. In one example, the length of the synchronization field may be determined and a power down level (such as a power off level, a very low power level, a low power level, a standby power level, etc.) for an idle state may be selected based in part on the length of the synchronization field. While the USB bus is inactive and/or while the USB device is transmitting data, one or more portions of the receiver may be placed in the idle mode at the selected power down level. In this manner, the one or more portions of the receiver are placed in the idle state (i.e., powered off; placed in a very low power mode; placed in a standby mode, or other idle mode, etc.) during various times while the USB bus is inactive and/or while the device is transmitting data, which can reduce the total amount of power consumed by the USB device. Various embodiments of the present invention will now be described.

Figure 1:
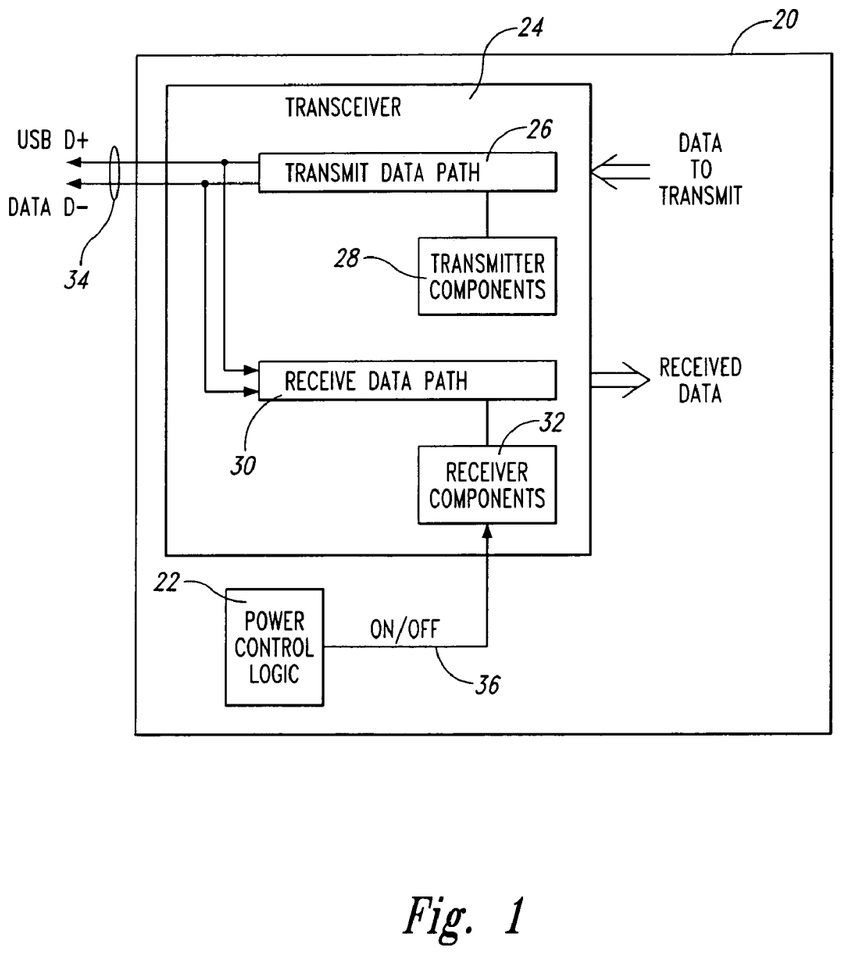
FIG. 1 illustrates a block diagram of a USB device including power control logic, in accordance with one embodiment of the present invention.

Referring to FIG. 1, a USB device 20 having power control logic 22 is illustrated in accordance with one embodiment of the present invention. In one example, device 20 has a transceiver 24 which may include a transmit data path 26 with transmit components 28 associated therewith, as well as a receive data path of 30 with receiver components 32 associated therewith. Both the transmit data path 26 and the receive data path 30 may be coupled with the USB data bus 34 (shown as D+ and D−), with the transmit data path 26 adapted to transmit data from the device 20 to the USB bus 34, and the receive data path 30 adapted to receive data from the USB bus 34 into the device 20 for processing therein. The USB device 20 may be, for example, a host or root device (i.e., the device 20 may be embedded within a computer or server), or device 20 may be hub or a peripheral device or any portion thereof. Device 20 may be used to form a USB device, and in one example device 20 is implemented as an integrated circuit or portion thereof.

In accordance with an embodiment of the present invention, power control logic 22 controls one or more power modes of the receiver components 32 under various conditions as described herein. For instance, power control logic 22 may provide power signal 36 to receiver components 32, such as a power-on signal a power-off signal. In this regard, a power-off signal includes signals which may turn off one or more receiver components, or which may place one or more receiver components in an idle state with an associated power down level such as a power off level, a very low power level, a low power level, a standby power level, or other power levels. The number and types of power down levels will depend on the particular implementation, and the various types of power down levels may take into account the tradeoff between power savings from placing the receiver components in a power saving idle state, and the amount of time (i.e., clock cycles) needed for the receiver components to awake from such a power saving idle state. As will be discussed below, the length of a synchronization field of a received message may be used to establish or dynamically select a power down level for a USB device.

In one example, one or more portions of receiver components 32 are provided to be responsive to the power signal 36. Receiver components 32 may include, for instance, a synchronizer for synchronizing a USB data signal from bus 34 to an internal clock reference of device 20 (see FIG. 2), or may include a physical interface (phy), or any other portions of the receiver components 32. Preferably, in one embodiment, portions of the receiver components 32 which consume significant amounts of current during high-speed USB operations are adapted to be responsive to power signal 36 of power control logic 22.

In one example, when device 20 is coupled with a bus 34 and initialized, power control logic 22 provides a power signal (i.e., powers on) to receiver components 32 for receiving an initial signal from USB bus 34, and upon receiving the initial signal, power control logic 22 measures the length of a synchronization field contained within the initial signal. In one example, power control logic 22 computes or associates a power down level of an idle state based, in part, on the length of the synchronization field of the initial signal. In one example, the longer the synchronization field, the greater the amount of power savings that may be achieved.

After device 20 has completed its processing of the initial signal from bus 34, power control logic 22 may disable the receiver components 32 (i.e., power-off or place in a low-power mode) until a later time when power control logic 22 will re-power receiver components 32. In one example, receiver components 32 are maintained in an idle mode/power savings mode when the USB bus is idle (i.e., no traffic) and/or when the device 20 is transmitting. When a subsequent signal is received from bus 34, power control logic 22 detects the presence of the subsequent signal, and power control logic generates a power-on signal 36 to the receiver components 32 so that the receiver components 32 can be active in a sufficient amount of time to synchronize or process the received signal. Once again, power control logic 22 may disable (i.e., power-off or place in a low-power mode, etc.) receiver components 32 and repeat this process. It can be seen that through the repeated power-off and power-on of receiver components 32, the average amount of power consumed by receiver components 32 may be substantially reduced when compared with devices that maintain constant power to receiver components. As mentioned, power control logic 22 may also issue a power-off signal to receiver components 32 whenever data is being transmitted from device 20 to the bus 34 through transmit data path 26 and transmitter components 28. Hence, receiver components 32 may be turned off or placed in a low-power mode or idle state whenever the bus 34 is idle as well as whenever the device 20 is transmitting data to the bus 34.

Figure 2:
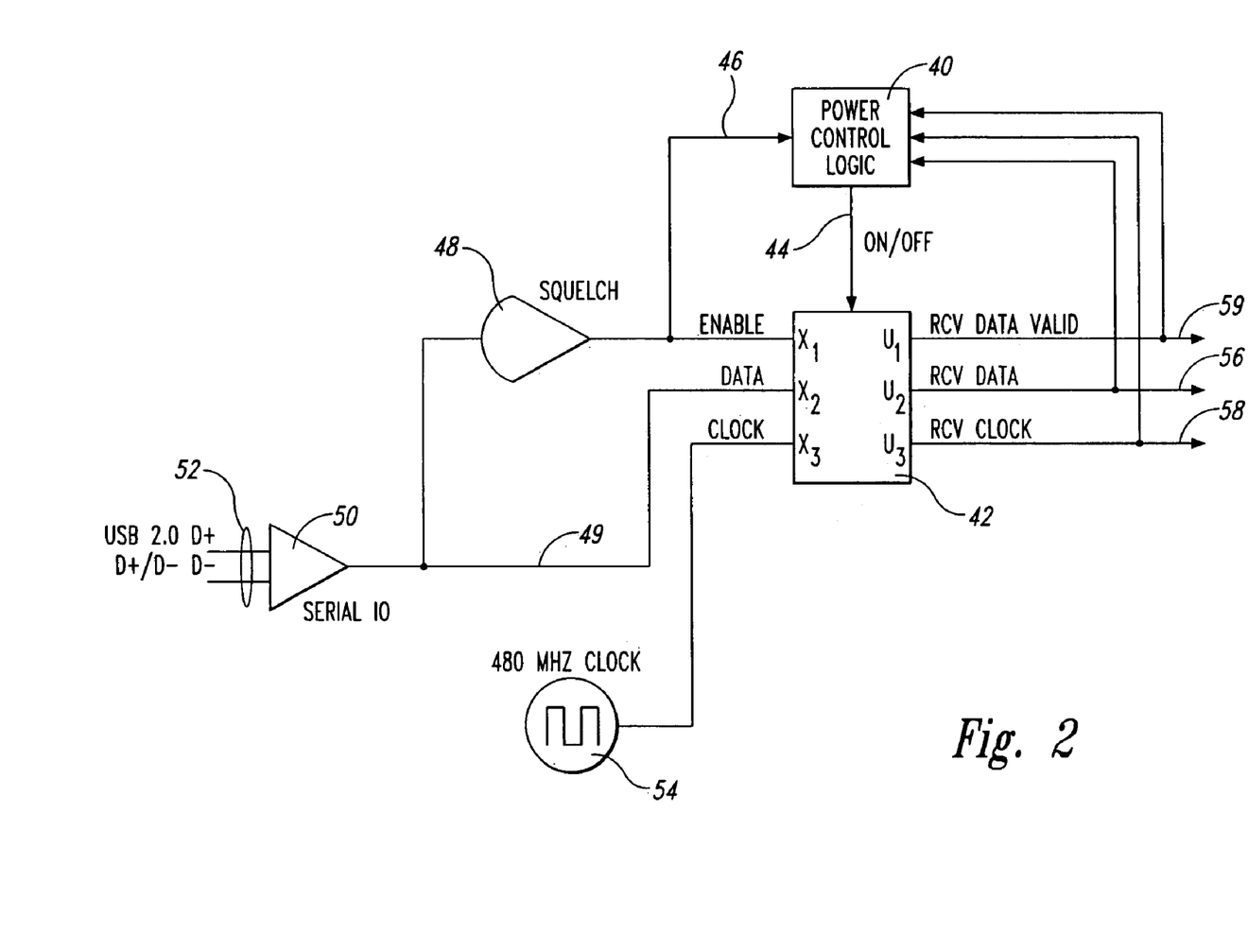
FIG. 2 illustrates a block diagram of a synchronizer component of a receive data path, the synchronizer component receiving a power signal from power control logic, in accordance with one embodiment of the present invention.

FIG. 2 illustrates one example of an implementation including embodiment of the present invention. In FIG. 2, power control logic 40 controls a synchronizer 42 through a power signal 44. Power logic 40 receives a signal 46 from a signal detector 48 (i.e., an envelope detector) coupled with a data signal 49 from a differential data receiver 50 coupled with bus 52. In this example, synchronizer 42 synchronizes the data signal 49 with a reference signal 54 (shown as a 480 MHz high-speed clock) so that the synchronizer can provide a data signal 56 referenced to clock signal 58 and a data valid signal 59 to other parts of a device. In this example, power control logic 40 initially provides a power-on signal 44 to synchronizer 42 to process an initial signal from bus 52, and power control logic 40 receives and counts the number of synchronization bits included within the initial signal (by examining signal lines 56, 58, 59). Power control logic 40 may power off (i.e., place in a low-power mode) synchronizer 42, for example, when the USB bus 52 is inactive, and upon receiving a signal 46 from envelope detector 48, power control logic 40 generates a power-on signal to synchronizer 42.

Accordingly, it can be seen that in this embodiment, power control logic 40 can control the power modes of synchronizer 42 so as to reduce the overall power consumed by synchronizer 42. It is understood that power control logic 40 could also control the power modes of other receiver components, such as one or more components of a phy. It is noted that while power control logic 22 is illustrated in FIG. 1 as being separate from transceiver 24, it is understood that power logic control 22 may be incorporated within transceiver 24 or otherwise associated therewith.

Figure 3:
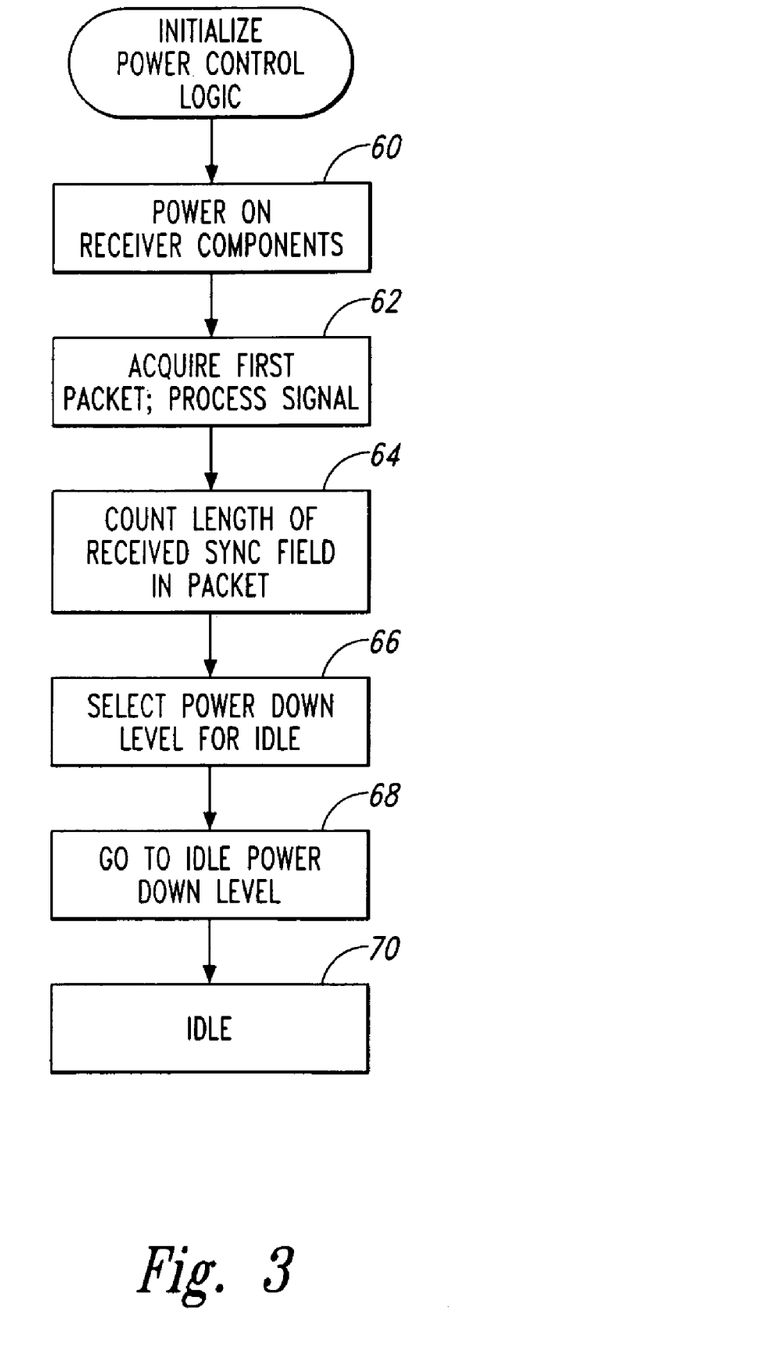
FIG. 3 illustrates an example of logical operations for initializing power control logic, in accordance with one embodiment of the present invention.

FIG. 3 illustrates an example of logical operations for initializing a power control logic, in accordance with one embodiment of the present invention. At operations 60, receiver components are provided with power (i.e., powered up in a fully functional mode supporting high-speed data operations).

At operations 62, a first signal and/or packet is received and the signal may be processed by the receiver components. In one example, the signal is a USB signal and contains a synchronization field containing 12 to 32 bits or symbols. As provided by the USB specification, all packets begin with a synchronization field which may be used by input circuitry of a device to align the incoming data with a local clock. In high-speed USB operations, the synchronization field typically includes 32 bits transmitted by a host, however hubs are allowed to drop up to four bits from the start of a synchronization pattern when repeating packets. Accordingly, after being repeated by five hubs, a packet's synchronization field may be as short as 12 bits.

At operations 64, the length of the received synchronization field in the packet is counted. In one embodiment, operations 64 counts the number of bits in the received synchronization field in the received packet. At operation 66, a power down level for an idle state of the receiver components is selected.

Generally, the receiver components are placed in an idle state when the USB bus is inactive (i.e., has no traffic). This idle state may be selected from various levels of power down levels which recognize that there is a tradeoff between power savings from placing the receiver components in a power saving state and response time (i.e., the amount of cycles needed to awake from a power saving state), and operation 66 may use the length of the received synchronization field to determine a power down level to be used by the power control logic for controlling the receiver components.

The power down levels may vary based in part on the length of the received synchronization field, and may include, for example, a reduced power mode which provides a first level of power savings and from which the receiver components will take a number of cycles to awake (i.e., 4 cycles); a low power mode which provides a second level of power savings (greater than the first level) from which the receiver components will take a number of cycles (i.e., 8 cycles) to awake which is greater than the number of cycles than in the low power mode; and an off state which provides a third level of power savings (greater than the second level) from which the receiver components will take a number of cycles (i.e., 16 cycles) to awake which is greater than the number of cycles than in the low power mode. In this way, the power control logic 22 can dynamically adjust and adapt the power down levels of the device 20 depending on the length of the synchronization field that the device 20 is receiving.

For instance, where the received synchronization field is relatively large (i.e., 32 bits), the device may be able to utilize a power down level for the receiver components which is relatively longer and which may be of a lower current consumption level than when compared with a power down level associated with a received synchronization field that is relatively short (i.e., 12 bits). In some instances, where the received synchronization field is very small, it may be possible that the power control logic 22 keeps the receiver components 32 in an idle state which does not afford significant power savings but provides the needed response time to synchronize with the incoming signals.

At operations 68, the one or more of the receiver components may be placed in the idle state (shown as block 70) at the power down level selected by operation 66. In this way, the particular level of power down (i.e., power savings) is determined in a way that reduces the chances that performance of the device 20 will be adversely affected.

In one embodiment, operations 60–66 are performed on an initial USB packet received by the device, and thereafter the receiver components are idle state (block 70). Alternatively, operations 60–66 may be performed using a set of messages received by the device 20 during an initial phase, such that operation 64 counts and recounts the length of the synchronization field from a set of received messages received during the initial phase. In this manner, a level of confidence in the number counted by operation 64 can be achieved, after which operations 66–68 may be performed, as well as the operations shown with reference to FIG. 4.

Figure 4:
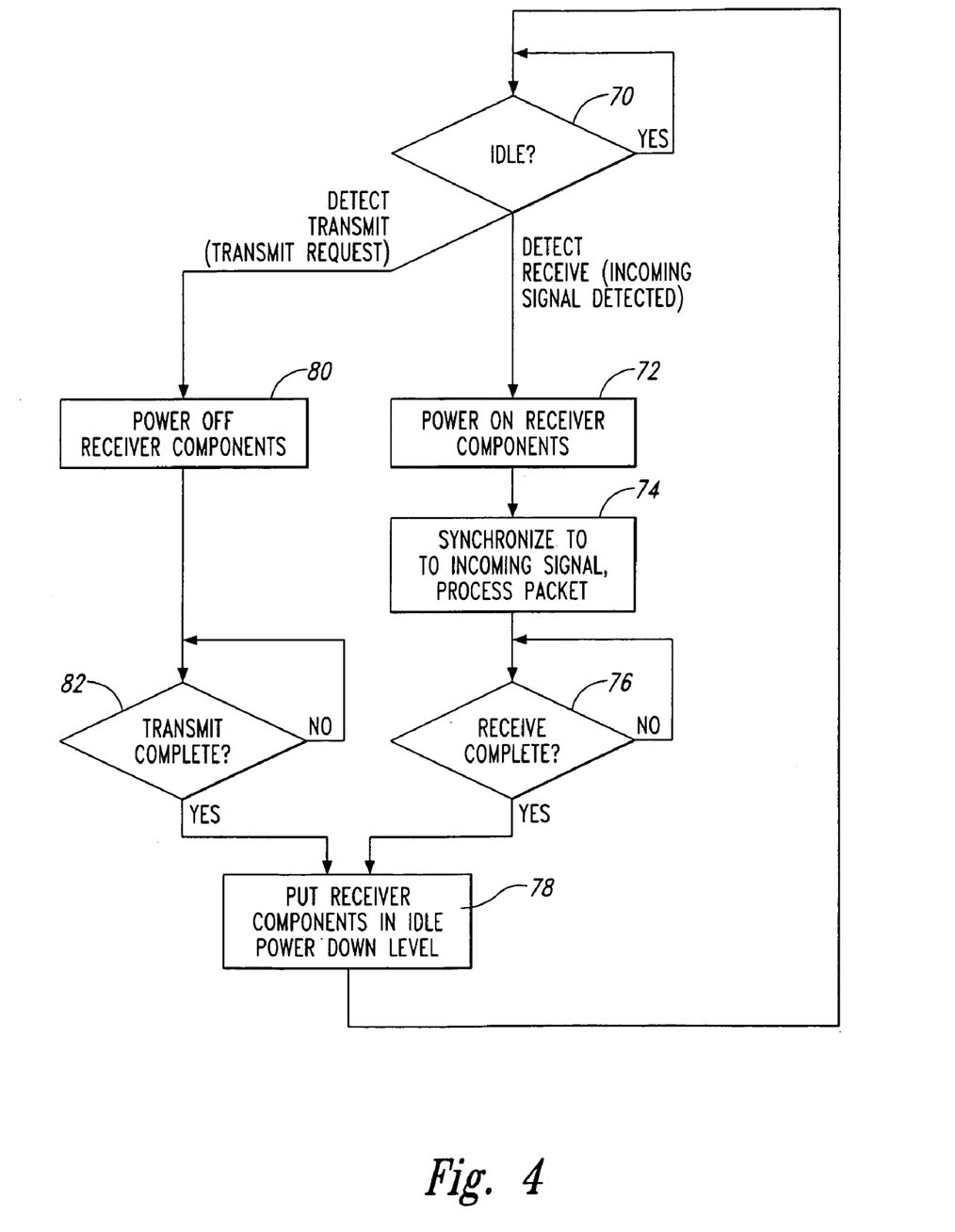
FIG. 4 illustrates an example of logical operations for providing one or more power signals to components in a USB device, in accordance with one embodiment of the present invention.

Referring to FIG. 4, one example is illustrated of logical operations for managing the power consumed by one or more receiver components of a USB device. At operation 70, the receiver components are in an idle mode as described with reference to operations 66–70 of FIG. 3. Generally, the receiver components are in an idle mode unless data is being received in which case the receiver components are in a fully operational mode. For example, if a USB bus to which the device 20 is attached has bus traffic for only 50 percent of the time (of which half of the traffic is transmission from the device 20), then in accordance with one embodiment of the present invention, the receiver components may be enabled or turned on in a fully operational mode for only 25 percent of the time, thereby resulting in a significant power savings when compared with USB devices which maintain the receiver components turned on all the time.

Upon detecting an incoming signal, control is passed to operation 72 where the receiver components are powered on. At operation 74, the receiver components synchronize to the incoming signal, and process the received packet. As described above with reference to FIG. 3, because the idle mode has been selected with a power down level which was based in part upon the length of the received synchronization field, operation 74 should repeatedly and consistently provided accurate synchronization to the synchronization field of the incoming signal. Operation 76 determines when the receipt of the message or messages is complete, and when complete, operation 78 returns the receiver components to the idle mode 70 at the power down level selected by operations 66 of FIG. 3.

Upon detecting a transmission request (i.e., the USB device will be or is transmitting data), operation 80 may power off the receiver components completely, in one example. In this manner, when device 20 is transmitting data, the receiver components are placed in a very low-power mode (i.e., an off mode) while device 20 is transmitting data. In this manner, an amount of power savings may be realized which may be greater than the amount of power savings had the receiver components been placed in the idle mode at the power down level of operations 66 of FIG. 3. Operation 82 determines when the transmission is complete, and when this occurs, control is passed to operation 78 which places the receiver components in the idle mode at the power down level selected by operation 66 of FIG. 3.

Accordingly, it can be seen that the operations of FIG. 3 and FIG. 4 provide for a USB device to dynamically and adaptively control and cycle the receiver components so as to provide an overall reduction of power consumption by the USB device. Hence, in accordance with one embodiment of the present invention, it can be seen that one or more of the operations of FIGS. 3–4 provide for management of the power consumption of receiver components of a USB device during times such as when the device is transmitting data and/or when the USB bus is inactive.

Figure 5:
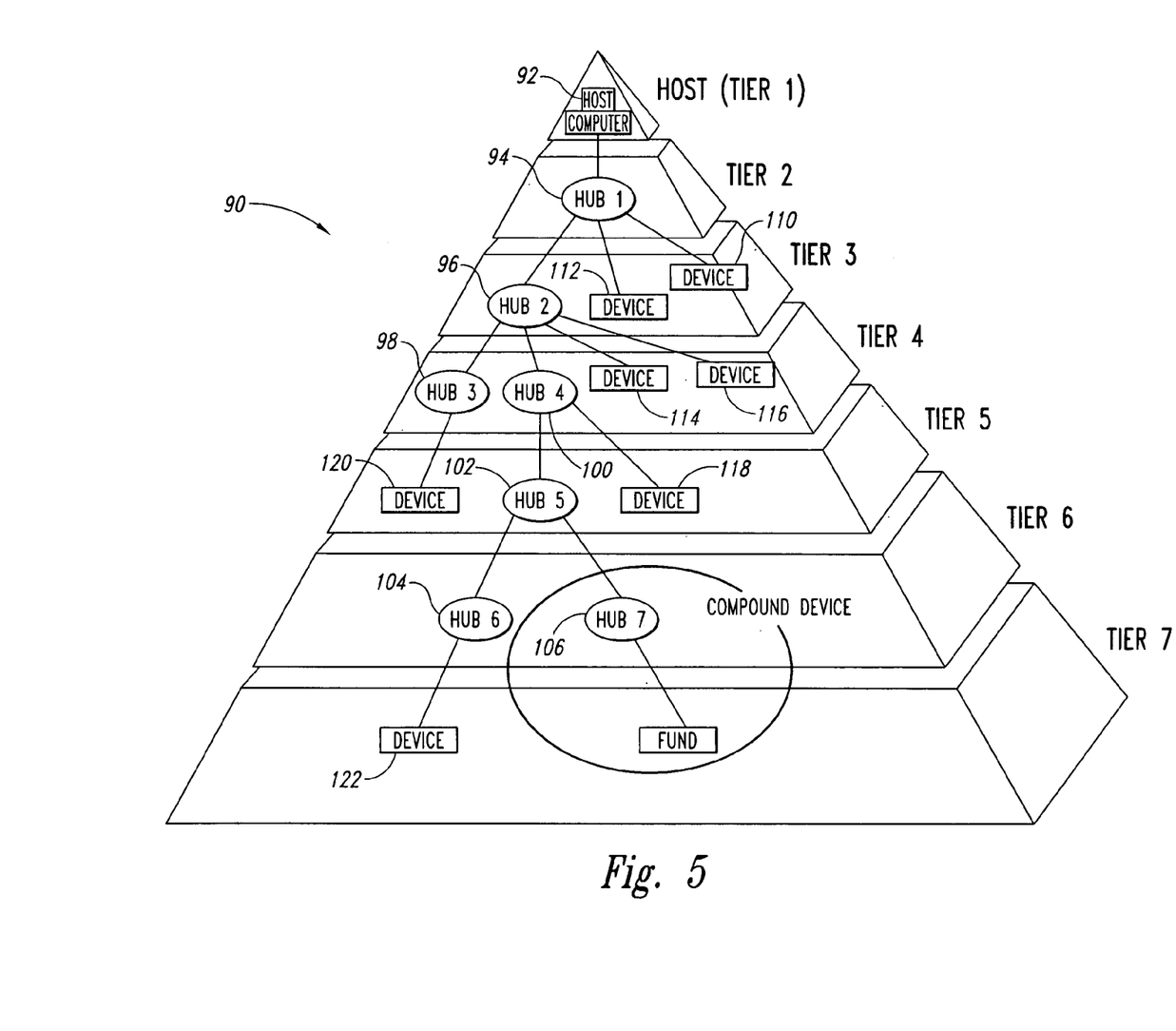
FIG. 5 illustrates an example of a USB network including a plurality of hubs and peripheral devices.

As mentioned above, the amount of power savings/power down level used by operation 66 of FIG. 3 may vary based on the length of the synchronization field of a received packet. Stated differently, when a device incorporating embodiments of the present invention is attached to a USB bus of a particular configuration, the device will typically receive USB messages having synchronization field lengths based on the position or tier of the device within the USB bus. FIG. 5 illustrates one example of a USB bus 90 having a host 92, a plurality of hubs 94–106, and a plurality of devices 110–122 distributed over a plurality of tiers (shown as Tier 1 to Tier 7).

In this example, assume the host 92 transmits USB signals using 32 bits in the synchronization field. Since hubs are permitted to drop up to four bits from the start of a synchronization pattern when repeating packets, hub 94 may transmit messages to devices 110, 112 using 28 bits of synchronization; hub 96 may transmit signals to devices 114, 116 using 24 synchronization bits; hubs 98 and 100 may transmit signals to devices 120, 118 respectively using 20 bits of synchronization; hub 102 may transmit signals to hub 104 using 16 bits of synchronization; and hub 104 may transmit signals to device 122 using 12 bits of synchronization. Accordingly, after being repeated by five hubs, device 122 may receive packet having a synchronization field as short as 12 bits.

Accordingly, it can be seen that a particular device in the USB bus 90 of FIG. 5 may receive USB packets/signals having a particular number of synchronization bits that differ from the number of synchronization bits received by a different device located on a different tier of the USB bus 90. Generally, the closer that a USB device is to the host 92 in the bus configuration 90, the greater number of synchronization bits which will be provided to the device, and accordingly, the greater amount of time may be available to that device for awaking its receiver components from the idle state (i.e., off or low-power, etc.).

Figure 6:
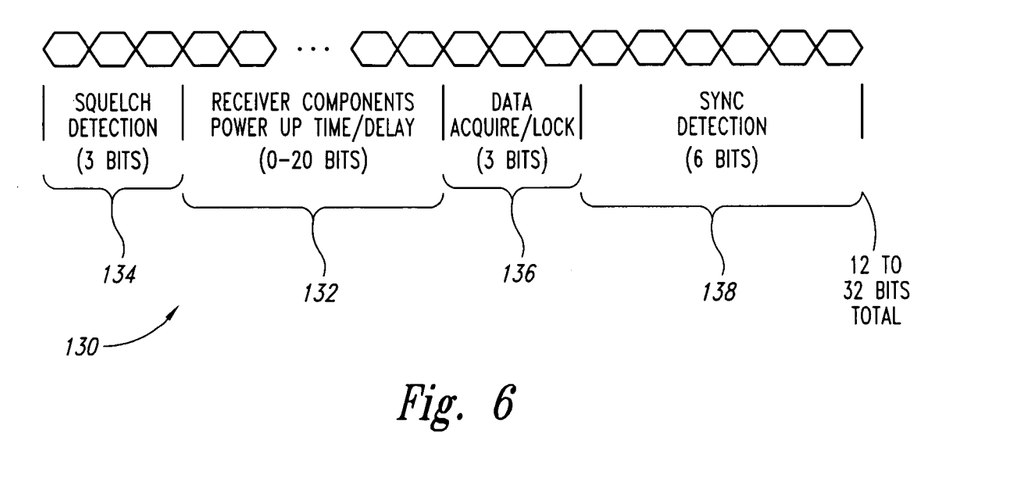
FIG. 6 illustrates an example of a SYNC portion of a USB transmission, wherein during a portion of the SYNC portion, components of a USB device may be powered-off, in accordance with one embodiment of the present invention.
Figure 7:
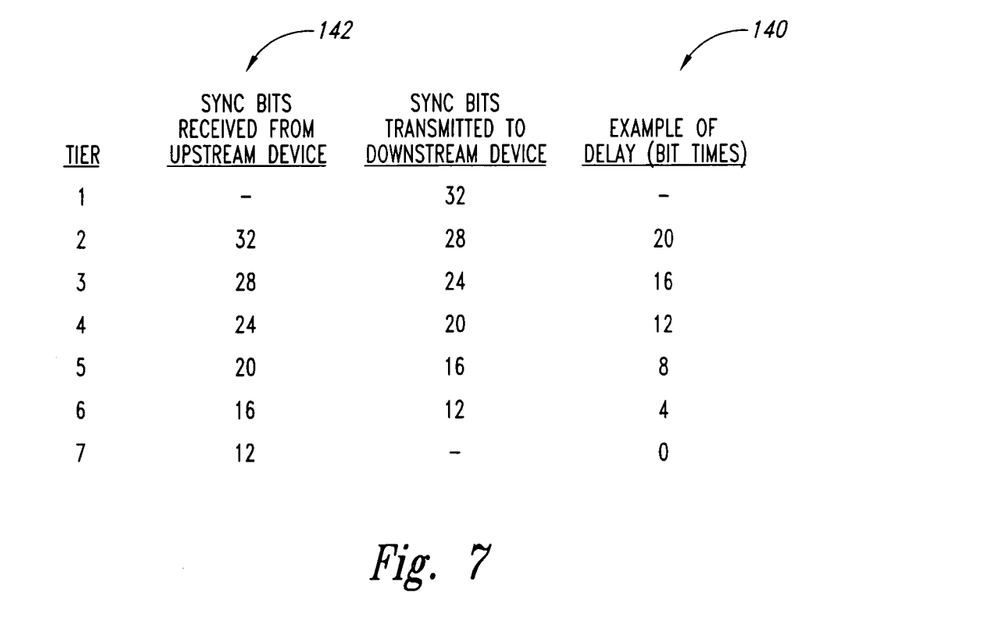
FIG. 7 illustrates an example of delay times which may be used, based in part on a number of synchronization bits received by another USB device, in accordance with one embodiment of the present invention.

FIG. 6 illustrates one example of a synchronization field 130 of 12 to 32 bits, a portion 132 of which may be devoted to time for awaking receiver components of a USB device from an idle/off/low-power mode. As shown in FIG. 6, a portion 134 (i.e., 3 bits) of the synchronization field is reserved for envelope detection (shown as squelch detection), a portion 136 (i.e., 3 bits) is reserved for acquiring data to lock on to, and a portion 138 (i.e., 6 bits) is provided for detection of synchronization. Hence, assuming the receiver is fully on and operational, at least 12 bits may be reserved in one example in order to ensure that a USB device would be able to successfully synchronize to a synchronization signal of only 12 bits. This means that, depending upon the implementation, any number of synchronization bits above 12 may be used as time to set or maintain receiver components of a USB device in an off (low-power) mode or to awake therefrom. For instance, if a synchronization signal is received having 28 bits (such as received by device 110 or 112 at tier 3 in FIG. 5) then the time in this instance could be set to 16 bits (i.e., 28 bits minus 12 bits). In another example, if a synchronization signal is received having 20 bits (such as received by device 118 or 120 at tier 5 in FIG. 5) then the time in this instance could be set to 8 bits (i.e., 20 bits minus 12 bits). FIG. 7 illustrates an example of various delay times 140, expressed in bit times, for USB devices based upon the number of synchronization bits 142 received from the upstream hub. Generally, as the number of delay bits 140 increases, the receiver may be placed in a more energy efficient, lower power level during idle. It is understood that, depending upon the implementation, it may be possible that a receiver could synchronize using fewer than 12 bits of the synchronization signal.

Hence, it can be seen that embodiments of the present invention permit for a USB device, including a hub or peripheral device, to dynamically form a power down level based upon the number of a synchronization bits received by the USB device depending upon where (i.e., which tier) the USB device is coupled with the bus. If, for instance, the USB device is a hand-held portable device coupled with hub 94, then upon initializing, the device may employ 16 bit times to awake its receiver components in one example. If the same USB device is disconnected from hub 94 and connected with hub 102, then upon initializing, the device may employ 4 bit times to awake its receiver components, in one example, which implies that this power down level will not be as energy efficient as in the case where 16 bit times are available for awaking the receiver components from a power down level of an idle mode.

Figure 8:
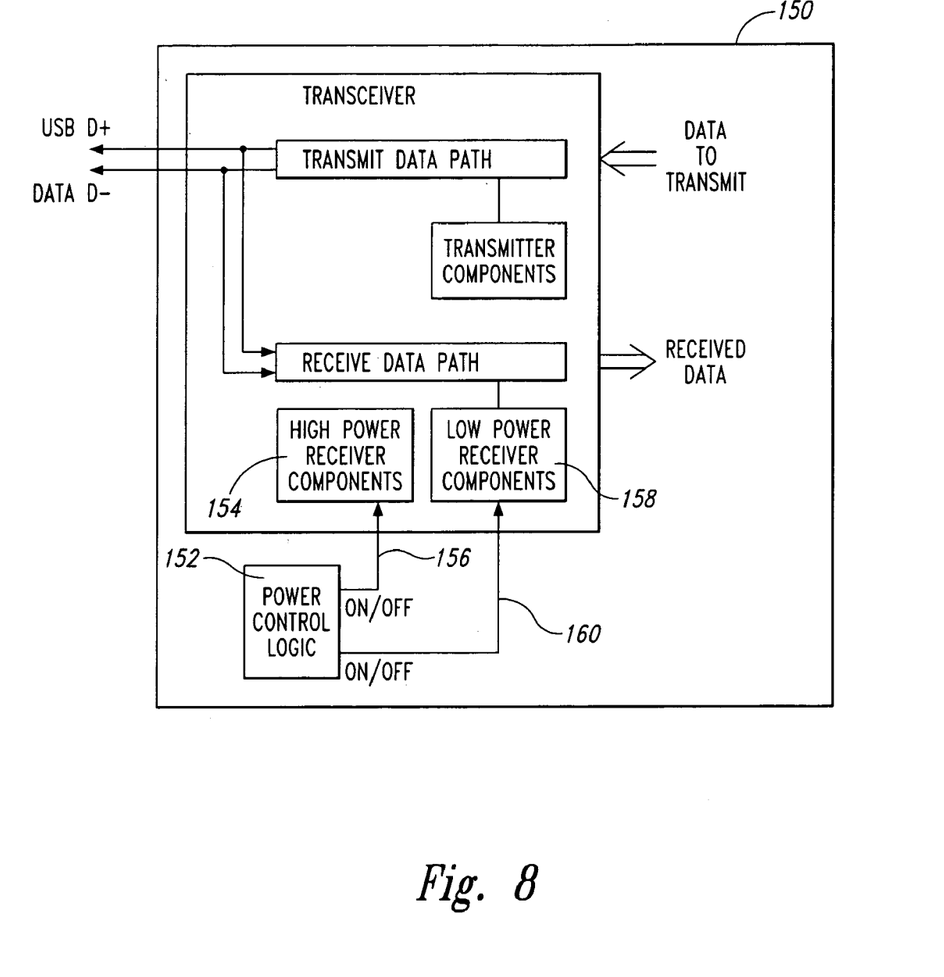
FIG. 8 illustrates a block diagram of another embodiment of the present invention.

FIG. 8 illustrates a block diagram another embodiment of the present invention, wherein USB device 150 includes power control logic 152 controlling a first set of one or more receiver components 154 through power signal 156 and a second set of one or more receiver components 158 through power signal 160. In this example, the first set of receiver components 154 has a high power consumption level, and the second set of receiver components 158 has a lower power consumption level. Power control logic 152 may selectively provide a power on signal 156 or 160 to either the first set 154 or the second set 158 of receiver components depending upon the operations of power control logic 152. In one example, power control logic 152 selects the first set of receiver components 154 to operate (and disables the second set of receiver components 158) during initialization, and if a synchronization field of sufficient length is identified, then power control logic 152 may turn off receiver components 154 and turn on receiver components 158 in order to reduce the total amount of power being used by device 150. As with the embodiments discussed above, device 150 may keep the receiver in an idle state while the USB bus is idle or the device itself is transmitting, and may dynamically employ various and differing times to awake its receiver depending upon the position of device 150 on a USB bus relative to the host.

Accordingly, it can be seen that embodiments of the present invention, incorporating one or more of the features or operations described herein, can be used to form a USB integrated circuit or USB device capable of adapting or managing power consumption by one or more components of its receiver, such as a synchronizer or a phy, and may be used during high speed USB operations.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to a preferred embodiment thereof, it will be understood by those skilled in the art that various other changes in the form and details may be made without departing from the spirit and scope of the invention.

I claim:

1. A device for coupling with a USB signal bus, comprising:
    a transceiver having a receive data path and a transmit data path, the receive data path coupled with the signal bus for receiving a data signal from the signal bus, and the transmit data path coupled with the signal bus;
    a component associated with the receive data path for processing the data signal received from the signal bus;
    power control logic for controlling a power mode of the component, and
    a clock reference signal;
    the device being characterized by a power consumption characteristic;
    wherein the component associated with the receive data path further comprises:
        a first synchronizer for synchronizing the data signal to the clock reference signal, said first synchronizer being characterized by a first power consumption level; and
        a second synchronizer for synchronizing the data signal to the clock reference signal, said second synchronizer being characterized by a second power consumption level;
    wherein said power control logic selectively provides a power-on signal to either said first or said second synchronizer to alter the power consumption characteristic of the device from a first amount associated with the first power consumption level to a second amount associated with the second power consumption level.

2. The device of claim 1, wherein the component is in a power-off mode for a portion of time while the USB signal bus is inactive.

3. The device of claim 1, wherein the component is in a power-off mode when the transceiver is transmitting data.

4. The device of claim 1, further comprising:
    a detector for detecting the data signal on the receive data path, said detector generating a data present signal indicating a presence of the data signal;
    wherein said data present signal is coupled with said power control logic.

5. The device of claim 4, wherein responsive to said data present signal, the power control logic sets or maintains the component in a power-off mode.

6. The device of claim 4, wherein the detector is an envelope detector.

7. The device of claim 1, wherein the data signal contains a synchronization field having a plurality of bits, and wherein the power control logic measures a length of the synchronization field.

8. The device of claim 7, wherein the power control logic forms a delay time based in part on the length of the synchronization field, and when the transceiver is receiving the data signal, the power control logic sets or maintains the component in an idle state for an amount of time related to the delay time.

* * * * *